United States Patent Office 3,557,189
Patented Jan. 19, 1971

3,557,189
α-CHLORO-β-(4-CHLOROPHENYL)-PROPIONIC ACID METHYL ESTER
Ludwig Eue, Cologne-Stammheim, Helmuth Hack, Cologne-Buchheim, Kurt Westphal, Wuppertal-Vohwinkel, and Richard Wegler, Leverkusen, Germany, assignors to Farbenfabriken Bayer Aktiengesellschaft, Leverkusen, Germany, a corporation of Germany
No Drawing. Original application Apr. 7, 1966, Ser. No. 540,844, now Patent No. 3,472,646, dated Oct. 14, 1969. Divided and this application Dec. 6, 1968, Ser. No. 795,762
Claims priority, application Germany, Apr. 17, 1965, F 45,840
Int. Cl. C07c 69/76
U.S. Cl. 260—476          1 Claim

ABSTRACT OF THE DISCLOSURE

α - Chloro - β - (4 - chlorophenyl) - propionic acid methyl ester which possesses selective herbicidal properties and which may be prepared by conventional methods.

---

This is a division of copending application Ser. No. 540,844, filed Apr. 7, 1966, now U.S. 3,472,646.

The present invention relates to particular phenyl-propionic acid compounds, some of which are known, which possess selective herbicidal properties, to their compositions with carrier vehicles, and to methods for the production and use thereof.

It is already known to use carbamates as selective herbicides. For example, 4 - chloro - 2 - butynyl - N - (3-chlorophenyl)-carbamate (A) is particularly well suited for combating weeds in cereals.

It is an object of the present invention to provide particular phenyl-propionic acid compounds, some of which are known, which possess valuable selective herbicidal properties, to provide active compositions in the form of mixtures of such compounds with solid and liquid dispersible carrier vehicles, to provide a process for producing such compounds, and to provide methods of using such compounds in a new way, especially for combating weeds, undesired plants, and the like.

Other and further objects of the present invention will become apparent from a study of the within specification and accompanying examples.

It has now been found, in accordance with the present invention, that phenyl-propionic acid compounds having the general formula:

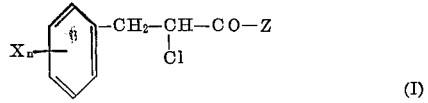

(I)

in which Z represents a member selected from the group consisting of —OR and

R represents a member selected from the group consisting of hydrogen, a salt-forming anion, aliphatic hydrocarbon, and substituted aliphatic hydrocarbon which is substituted with a member selected from the group consisting of halo, hydroxy, amino, alkylamino, and mixtures thereof, R' and R'' each respectively represents a member selected from the group consisting of hydrogen, and alkyl, X represents a member selected from the group consisting of halo, nitro, alkyl, haloalkyl, and mixtures thereof, and n is a number from 1–3, exhibit strong, selective herbicidal properties.

It is very surprising that the particular active compounds usable according to the present invention are superior to the previously known carbamates with regard to their selective herbicidal properties. Thus, for example, when used for combating weeds in cereals by the post-emergence method, the instant active compounds have a greater selective herbicidal action than said 4-chloro-2-butynyl - N - (3 - chlorophenyl) - carbamate (A). In addition, the instant compounds also have a significantly good selective herbicidal action when used by the pre-emergence method, while the previously known 4-chloro-2-butynyl-N-(3-chlorophenyl)-carbamate (A), when employed in accordance with this method, has hardly any effectiveness.

The particular active compounds usable according to the present invention thus represent a valuable addition to the art.

Some of the particular compounds usable according to the present invention are known. Those which are new can, however, be produced according to known processes in the same way as the known phenyl-propionic acids.

A method of production of the particular active compounds of the invention which may, quite generally, be used and which comprises altogether 5 steps, is illustrated by the following equations:

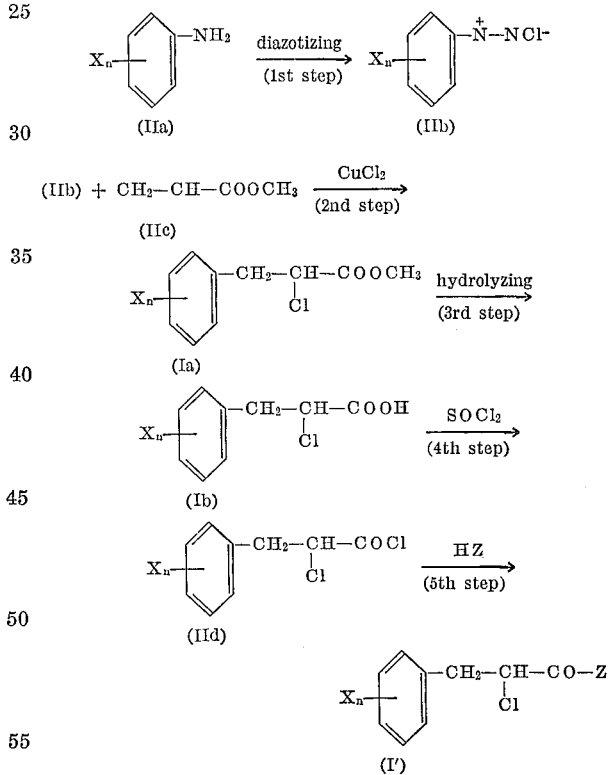

The reactions according to steps 1–5 are explained in greater detail by way of the following:

In the first step, the amines (IIa) are diazotized, advantageously in the presence of water and hydrochloric acid at temperatures of 0–20° C.

In the second step, the resultant diazo compounds (IIb) are reacted with methyl acrylate (IIc), which is expediently dissolved in a water-miscible solvent, such as acetone. The reaction temperatures of this step generally are between about 10 and 60° C. and the corresponding α-chloro-β-phenyl-propionic acid methyl ester (Ia) is formed.

The third step is an ester hydrolysis which can be carried out in conventional manner, for example, with hydrogen chloride in the presence of formic acid at temperatures between about 80 and 110° C. whereby to form the concomitant free acid, i.e., α-chloro-β-phenyl-propionic acid (Ib).

The fourth step comprises the preparation of the corresponding carboxylic acid chloride (IId). This is produced in usual manner, for example, by the reaction of the free acid (Ib) with thionyl chloride at temperatures between 60 and 90° C., preferably in an excess of boiling thionyl chloride.

In the fifth step, the resultant acid chloride (IId) is reacted with an appropriate alcohol or amine. The reaction with the alcohol can be carried out in the presence of an excess of the alcohol at temperatures between 60 and 120° C. The reaction with the amine can also be carried out in the presence of an alcohol, for example, at temperatures of 0–100° C.

When the particular active substances usable according to the present invention are salts, then these are prepared in known manner from the free acid (Ib).

The particular active compounds according to the present invention have a very strong influence on plant growth but they act in different ways so that they can be used, in particular, as selective herbicides. They are capable, for example, of selectively destroying weeds in cereals, viz., also grass-like weeds, especially wild oats.

Advantageously, when the particular active compounds usable according to the present invention are applied in very large quantities, they have a total herbicidal action.

Typical individual cultivated plants for which the particular phenyl-carboxylic acid compounds of the present invention can be used, include barley (Hordeum), wheat (Triticum), millet (Panicum), rice (Oryza) and corn (Zea).

Examples of weeds contemplated herein include dicotyledons, such as mustard (Senapis), cleavers (Galium), chickweed (Stellaria), camomile (Matricaria) and stinging nettle (Urtica); and monocotyledons, such as dimothy (Phleum), meadow grass (Poa), wild oats (*Avena fatua*), Ray grass (Lolium) and barnyardgrass (Echinochloa).

Thus, the particular compounds of the instant invention can be used as herbicides either alone or in admixture with solid or liquid carriers or diluents.

The active compounds according to the instant invention can be utilized, if desired, in the form of the usual formulations or compositions with dispersible carrier vehicles, such as solutions, emulsions, suspensions, emulsifiable concentrates, spray powders, pastes, soluble powders, dusting agents, granules, etc. These are prepared in known manner, for instance by extending the active agents with dispersible liquid diluent carriers and/or dispersible solid carriers optionally with the use of carrier vehicle assistants, e.g., surface-active agents, including emulsifying agents and/or dispersing agents, whereby, for example, in the case where water is used as diluent, organic solvents may be added as auxiliary solvents (cf. Agricultural Chemicals, March 1960, pp. 35–38. The following may be chiefly considered for use as carrier vehicles for this purpose: dispersible liquid diluent carriers, such as aromatic hydrocarbons (for instance, benzene, toluene, xylene, etc.), halogenated, especially chlorinated, aromatic hydrocarbons (for instance, chlorobenzenes), paraffins (for instance, petroleum fractions), chlorinated aliphatic hydrocarbons (for instance, methylene chloride, etc.), alcohols (for instance, methanol, ethanol, propanol, butanol, etc.), ethers, ether-alcohols (for instance, glycol monomethyl ether etc.), amines (for instance, ethanolamine, etc.), amides (for instance dimethyl formamide, etc.), sulfoxides (for instance, dimethyl sulfoxide, etc.), ketones (for instance, acetone, etc.), and water; as well as dispersible finely divided solid carriers, such as ground natural minerals (for instance, kaoline, alumina, silica, chalk, i.e., calcium carbonate, talc, kieselguhr, etc.), and ground synthetic minerals (for instance, highly dispersed silicic acid, silicates, e.g., alkali silicates, etc.); whereas the following may be chiefly considered for use as carrier vehicle assistants, e.g., surface-active agents, for this purpose: emulsifying agents, such as nonionic and anionic emulsifying agents (for instance, polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and dispersing agents, such as lignin, sulfite waste liquors, methyl cellulose, etc.

As will be appreciated by the artisan, the active compounds according to the instant invention may be present in such formulations or compositions in the form of mixtures with one another and with other known active substances, if desired.

The substances according to the invention may be employed, therefore, by themselves as the artisan will appreciate, in the form of their compositions with solid or liquid disersible carrier vehicles or other known compatible active agents, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1 and 95% by weight, and preferably 0.5 and 90% by weight, of the mixture, whereas carrier composition mixtures suitable for direct application or field application generally contemplate those in which the active compound is present in an amount substantially between about 0.01 and 1.0%, preferably 0.05 and 0.5%, by weight of the mixture. Thus, the present invention contemplates over-all compositions which comprise mixtures of a dispersible carrier vehicle such as a dispersible carrier solid, or a dispersible carrier liquid preferably including a carrier vehicle assistant, e.g., a surface-active agent, such as an emulsifying agent and/or a dispersing agent, and an amount of the active compound which is effective for the purpose in question and which is generally between about 0.01 and 95% by weight of the mixture. Specifically, the active compound may be applied to a surface area, such as in pre-emergence use, in concentrations substantially between about 1 and 20 kg. per hectare, preferably 3 and 15 kg. per hectare, although it will be appreciated that in connection with the pre-emergence use of the instant compounds, as well as the post-emergence use thereof, the concentration may be varied within a fairly wide range. However, generally the post-emergence range of concentration will be 0.01 and 95% by weight of the mixture as aforesaid, while the pre-emergence range will be between about 1 and 20 kg. per hectare, as aforesaid.

Furthermore, the present invention contemplates methods of selectivity controlling or combating undesired plants, e.g., weeds and the like, which comprise applying to at least one of (a) such weeds and (b) their habitat, a herbicidally effective amount of the particular active compound of the invention alone or together with a carrier vehicle as noted above. The instant formulations or compositions are applied in the usual manner, for example, by spraying, atomizing, scattering, dusting, watering sprinkling, and the like, whether for pre-emergence application to the soil or post-emergence application to the weeds.

The following examples are given for the purpose of illustrating, without limiting, the utility of the instant compounds usable according to the present invention:

EXAMPLE 1

Post-emergense test

Solvent: 20 parts by weight acetone
Emulsifier: 5 parts by weight alkylaryl polyglycol ether To produce a suitable preparation of the particular active compound, 1 part by weight of such active compound is mixed with the stated amount of solvent, then the stated amount of emulsifier is added, and the resulting concentrate is diluted with water to the desired final concentration.

Test plants of about 5–15 cm. height are sprayed with the preparation of the given active compound until just dew moist. After three weeks, the degree of damage to the plants is determined and characterized by the values 0–5, which have the following meanings:

0: no effect
1: a few slightly burnt spots
2: marked damage to leaves
3: some leaves and parts of stalks partially dead
4: plant partially destroyed
5: plant completely dead.

The particular active compounds, their concentrations and the results obtained can be seen from the following Table 1:

TABLE I.—POST-EMERGENCE TEST

| Active compound | | Active compound concentration as percent | Wild oats | Barley | Wheat |
|---|---|---|---|---|---|
| (A) | 4-Cl-C$_6$H$_4$—NH—CO—OCH$_2$—C—OCH$_2$Cl (known) | 0.2<br>0.1 | 3<br>3 | 1<br>0 | 1<br>0 |
| (III) | 2-Cl-C$_6$H$_4$—CH$_2$CHClCOOCH$_3$ | 0.2<br>0.1 | 5<br>4–5 | 1<br>0 | 0<br>0 |
| (IV) | 4-Cl-C$_6$H$_4$—CH$_2$CHClCOOCH$_3$ | 0.2<br>0.1<br>0.05 | 5<br>5<br>4–5 | 3<br>1<br>0 | 1<br>0<br>0 |
| (V) | 4-Cl-C$_6$H$_4$—CH$_2$CHClCOOH | 0.2<br>0.1 | 5<br>4–5 | 1–2<br>0 | 0<br>0 |
| (VI) | 4-Cl-C$_6$H$_4$—CH$_2$CHClCONH$_2$ | 0.2<br>0.1 | 3–4<br>3 | 0<br>0 | 0<br>0 |
| (VII) | 3-NO$_2$-C$_6$H$_4$—CH$_2$CHClCOOCH$_3$ | 0.2<br>0.1 | 5<br>4–5 | 0<br>0 | 0<br>0 |
| (VIII) | 2-Cl-C$_6$H$_4$—CH$_2$CHClCONHC$_2$H$_5$ | 0.2<br>0.1 | 4<br>4 | 2<br>0 | 1<br>0 |
| (IX) | 2-Cl-3-CH$_3$-C$_6$H$_3$—CH$_2$CHClCOOCH$_3$ | 0.2<br>0.1 | 5<br>4 | 2<br>0 | 0<br>0 |
| (X) | 3-F$_3$C-C$_6$H$_4$—CH$_2$CHClCOOCH$_3$ | 0.2<br>0.1 | 4–5<br>4 | 1–2<br>0 | 0<br>0 |
| (XI) | 2-Cl-C$_6$H$_4$—CH$_2$CHClCOOC$_8$H$_{17}$ | 0.2<br>0.1 | 5<br>4–5 | 2<br>0 | 1<br>0 |
| (XII) | 2-Cl-C$_6$H$_4$—CH$_2$CHClCOOC$_{12}$H$_{25}$ | 0.2<br>0.1 | 4–5<br>4 | 2<br>1 | 0<br>0 |
| (XIII) | 2-Cl-C$_6$H$_4$—CH$_2$CHClCOOCH(CH$_3$)$_2$ | 0.2<br>0.1 | 5<br>4–5 | 1<br>0 | 0<br>0 |
| (XIV) | 2-Cl-C$_6$H$_4$—CH$_2$CHClCOOCH$_2$C≡H | 0.2<br>0.1 | 5<br>4–5 | 2<br>0 | 1<br>0 |
| (XV) | 2-Cl-C$_6$H$_4$—CH$_2$CHClCOOCH$_2$CH$_2$Cl | 0.2<br>0.1<br>0.5 | 5<br>4–5<br>4–5 | 1<br>0<br>0 | 1<br>0<br>0 |
| (XVI) | 2,4-Cl$_2$-C$_6$H$_3$—CH$_2$CHClCOOCH$_2$CH=CH$_2$ | 0.2<br>0.1 | 5<br>4 | 2<br>0 | 1<br>0 |

TABLE I.—POST-EMERGENCE TEST—Continued

| Active compound | | Active compound concentration as percent | Wild oats | Barley | Wheat |
|---|---|---|---|---|---|
| | | 2d comparative test | | | |
| (A') | 4-chloro-2-butynyl-N-(3-chloro-phenyl)-carbamate. (known) | 0.2<br>0.1 | *3<br>*3 | 1<br>0 | 1<br>0 |
| (XVIII) | Cl—⟨C₆H₄⟩—CH₂—CH(Cl)—COONa | 0.2<br>0.1 | 5<br>4-5 | 1<br>0 | 0<br>0 |
| (XVIII) | Cl—⟨C₆H₄⟩—CH₂—CH(Cl)—COONH₄ | 0.2<br>0.1 | 5<br>4-5 | 1<br>0 | 0<br>0 |
| (XIX) | Cl—⟨C₆H₄⟩—CH₂—CH(Cl)—COONH₃C₂H₅ | 0.2<br>0.1 | 5<br>5 | 1<br>0 | 1-2<br>0 |
| (XX) | F—⟨C₆H₄⟩—CH₂—CH(Cl)—COOCH₃ | 0.2<br>0.1 | *4<br>*3 | 1<br>0 | 0<br>0 |
| (XXI) | Br—⟨C₆H₄⟩—CH₂—CH(Cl)—COOCH₃ | 0.2<br>0.1 | 4-5<br>4 | 1-2<br>0 | 1<br>0 |

*The plant growth is inhibited irreversibly.

EXAMPLE 2

Pre-emergence test

Solvent: 20 parts by weight acetone
Emulsifier: 5 parts by weight alkylaryl polyglycol ether To produce a suitable preparation of the particular active compound, 1 part by weight of such active compound is mixed with the stated amount of solvent, then the stated amount of emulsifier is added, and the resulting concentrate is diluted with water to the desired final concentration.

Seeds of the test plants are sown in normal soil and, after 24 hours, watered with the preparation of the given active compound. It is expedient to keep contsant the amount of water per unit area. The concentration of such active compound in the preparation is of no importance, only the amount of active compound per unit area being decisive. After three weeks, the degree of damage to the plants is determined and characterized by the values 0–5, which have the following meanings:

0: no effect
1: slight damage or delay in growth
2: marked damage or inhibition of growth
3: heavy damage and only deficient development, or only 50% emerged
4: plants partially destroyed after germination, or only 25% emerged
5: plants completely dead or not emerged.

The particular active compounds, the amounts applied, and the results obtained can be seen from the following Table 2:

TABLE II.—PRE-EMERGENCE TEST

| Active compound | | Amount applied kg./ha. | Wheat | Barley | Wild Oats |
|---|---|---|---|---|---|
| (A'') | ⟨C₆H₄(Cl)⟩—NH—CO—OCH₂C=CCH₂Cl (known) | 10<br>5 | 3<br>2 | 2<br>0 | 2<br>0 |
| (III') | ⟨C₆H₄(Cl)⟩—CH₂CHClCOOCH₃ | 10<br>5 | 0<br>0 | 2<br>1 | 5<br>4 |
| (IV') | Cl—⟨C₆H₄⟩—CH₂CHClCOOCH₃ | 10<br>5 | 0<br>0 | 1<br>0 | 4-5<br>4 |
| (XVI') | ⟨C₆H₄(Cl)⟩—CH₂CHClCOOCH₂CH=CH₂ | 40<br>5 | 1<br>0 | 1-2<br>0 | 4-5<br>4 |

The five-step method of production of the instant compounds is illustrated in particular detail in accordance with the following:

EXAMPLE 3

1st and 2nd step 63.8 g. of m-chloroaniline are dissolved at an elevated temperature in 300 cc. of water and 100 cc. of concentrated hydrochloric acid and diazotized, after cooling with ice. The diazo solution is buffered with sodium acetate, clarified and stirred into a solution, at about 40° C., of 14 g. of cupric chloride dihydrate and 43 g. of methyl acrylate in 1.5 liters of acetone. When the evolution of nitrogen has stopped, the reaction mixture is diluted with water and extracted with ether. The residue of the ethereal phase boils at 106° C./0.08 mm. Hg. 46.7 g. of α-chloro-β-(m-chlorophenyl)-propionic acid methyl ester (III″) are obtained.

To produce other esters and amides, the aforementioned methyl ester can be hydrolyzed to the free acid according to the following procedure and then converted into the corresponding acid chloride:

3rd step

Hydrogen chloride is introduced at 100° C., within the course of 3.5 hours, into a solution of 10 g. of the above-mentioned methyl ester (III‴) in 50 cc. of formic acid. The formic acid is then distilled off under reduced pressure, and the residue taken up in a 10% sodium carbonate solution. Neutral components are removed with ether and the aqueous solution is rendered acid to Congo Red. The α-chloro-β-(m-chlorophenyl)-propionic acid having the formula

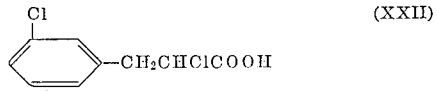

(XXII)

precipitates and is recrystallized from dilute acetic acid, after which it melts at 76° C. Yield: 7 g.

4th step

From the above-mentioned free acid (XXII′) there is obtained, by boiling with thionyl chloride and subsequent vacuum distillation, α-chloro-β-(m-chlorophenyl)-propionyl chloride, which boils at 134° C./7 mm. Hg. Yield: 85% of theory.

General instructions for the preparation of the appropriate esters and amides from the acid chloride:

5th step.—Preparation of the isopropyl ester 75 cc. of isopropanol are placed in a flask provided with stirrer and 11.7 g. of α-chloro-β-(m-chlorophenyl)-propionyl chloride are added dropwise. The reaction mixture is then heated at 100° C. for 1 hour and the solvent subsequently distilled off under reduced pressure. The residue in the distillation flask is taken up in ether and shaken with a sodium carbonate solution. The isopropyl ester remains in the ether. After evaporation, there are obtained 12 g. of α-chloro-β-(m-chlorophenyl)-propionic acid isopropyl ester (XIII′), which boils at 125° C./1 mm. Hg.

Preparation of the ethylamide

When the chloride is mixed in the same manner with a dilute alcoholic solution of ethylamine, then there is obtained α-chloro-β-(m-chlorophenyl)-propionic acid ethyl amide (VIII′), which boils at 142° C./0.8 mm. Hg. Yield: 60% of theory.

The particular compounds listed in Table 3 below can be prepared in an analogous manner. These compounds correspond to the general Formula I, the specific significance of the different symbols Z in the general formula being given in such table. Furthermore, the position of each substituent X and the number of such substituents, in the phenyl nucleus is also indicated in Table 3.

TABLE III.—SCHEDULE OF VARIOUS PHENYL-PROPIONIC ACID COMPOUNDS

| Number | $X_n$ | Z | M.P., °C. | B.P./mm. Hg |
|---|---|---|---|---|
| 1 | 3-Cl | —OCH₃ | | [1] 106/0.08 |
| 2 | 4-Cl | —OCH₃ | | [1] 111/0.1 |
| 3 | 2-NO₂ | —OCH₃ | | 140/0.1 |
| 4 | 2-CH₃ / 3-Cl | —OCH₃ | | 130/0.05 |
| 5 | 3-CF₃ | —OCH₃ | | 119/8 |
| 6 | 4-Cl | OH | 103 | |
| 7 | 4-Cl | —NH₂ | 90 | |
| 8 | 3-Cl | —NHC₂H₅ | | 142/0.01 |
| 9 | 3-Cl | —OC₈H₁₇ | | 166/0.8 |
| 10 | 3-Cl | —OC₁₂H₂₅ | | 190/0.3 |
| 11 | 3-Cl | —OCH(CH₃)₂ | | 125/1 |
| 12 | 3-Cl | —OCH₂C=CH | | 134/0.2 |
| 13 | 3-Cl | —OCH₂CH₂Cl | | 150/0.2 |
| 14 | 3-Cl / 5-Cl | —OCH₂CH=CH₂ | | 144/0.2 |
| 15 | 2-Cl / 5-Cl | OCH₃ | | 120/0.1 |
| 16 | 2-CH₃ / 4-Cl | —OCH₃ | | 122/0.3 |
| 17 | 3-Cl | —NH₂ | 103 | |
| 18 | 3-Cl | —N(C₂H₅)₂ | | 145/0.1 |
| 19 | 3-Cl | —OCH₂CH=CH₂ | | 157/8 |
| 20 | 3-F | —OCH₃ | | 125/0.1 |
| 21 | 4-Br | —OCH₃ | | 126/0.1 |
| 22 | 3-Cl | —OCH₂CCl₃ | | 153/0.3 |

[1] New compound.

The foregoing compounds of Table III may be specifically identified as follows:

Number

1 ......... (III⁗) α-chloro-β-(3-chlorophenyl)-propionic acid methyl ester.
2 ......... (IV″) α-chloro-β-(4-chlorophenyl)-propionic acid methyl ester.
3 ......... (VII′) α-chloro-β-(2-nitrophenyl)-propionic acid methyl ester.
4 ......... (IX′) α-chloro-β-(2-methyl-3-chlorophenyl)-propionic acid methyl ester.
5 ......... (X′) α-chloro-β-(3-trifluoromethyl-phenyl)-propionic acid methyl ester.
6 ......... (V′) α-chloro-β-(4-chlorophenyl)-propionic acid.
7 ......... (VI′) α-chloro-β-(4-chlorophenyl)-propionic acid amide.
8 ......... (VIII″) α-chloro-β-(3-chlorophenyl)-propionic acid ethyl amide.
9 ......... (XI′) α-chloro-β-(3-chlorophenyl)-propionic acid octyl ester.
10 ......... (XII′) α-chloro-β-(3-chlorophenyl)-propionic acid dodecyl ester.
11 ......... (XIII″) α-chloro-β-(3-chlorophenyl)-propionic acid isopropyl ester.
12 ......... (XIV′) α-chloro-β-(3-chlorophenyl)-propionic acid propyn-(2)-yl ester.
13 ......... (XV′) α-chloro-β-(3-chlorophenyl)-propionic acid 2-chloroethyl ester.
14 ......... (XVI″) α-chloro-β-(3,5-dichlorophenyl)-propionic acid propen-(2)-yl ester.
15 ......... (XXIII) α-chloro-β-(2,5-dichlorophenyl)-propionic acid methyl ester.
16 ......... (XXIV) α-chloro-β-(2-methyl-4-chloro-phenyl)-propionic acid methyl ester.
17 ......... (XXV) α-chloro-β-(3-chlorophenyl)-propionic acid amide.
18 ......... (XXVI) α-chloro-β-(3-chlorophenyl)-propionic acid diethyl amide.
19 ......... (XXVII) α-chloro-β-(3-chlorophenyl)-propionic acid propen-(2)-yl ester.
20 ......... (XX′) α-chloro-β-(3-fluorophenyl)-propionic acid methyl ester.
21 ......... (XXI′) α-chloro-β-(4-bromophenyl)-propionic acid methyl ester.
22 ......... (XXVIII) α-chloro-β-(3-chlorophenyl)-propionic acid 2,2,2-trichloroethyl ester.

Also of significance is the compound α-chloro-β-(4-chlorophenyl)-propionic acid 2-chloroethyl ester having the formula:

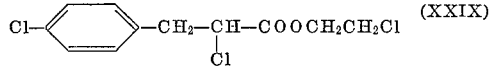

(XXIX)

B.P. 147° C./0.1 mm. Hg

EXAMPLE 4

In the same manner, using corresponding molar amounts of the following starting materials:

(a) α-Chloro-β-(4-bromophenyl)-propionyl chloride and potassium methylate;

(b) α-Chloro-β-(3-nitrophenyl)-propionyl chloride and calcium butyrate;

(c) α-Chloro-β-[4-(3′,3′,3′-trichloro)-n-propyl phenyl]-propionyl chloride and magnesium butyrate;

(d) α-Chloro-β-(2-chloro-4-nitro-phenyl)-propionyl chloride and 3-bromo-octanol;

(e) α-Chloro-β-(3-fluorophenyl)-propionyl chloride and fluoro-tert.-butanol (i.e., 1,1-dimethyl-2-fluoro-ethanol);

(f) α-Chloro-β-(2-isopropyl-phenyl)-propionyl chloride and 2-hydroxy allyl alcohol (i.e., 2,3-dihydroxy propene-1);

(g) α-Chloro-β-(3-methyl-5-nitro-phenyl)-propionyl chloride and 3-amino butynyl alcohol (i.e., 2-amino-butyn-(3)-yl-ol-1);

(h) α-Chloro-β-[4-(1'-chloro-2'-bromo)-ethyl-phenyl]-propionyl chloride and 4-N-methylamino-octanol;

(i) α-Chloro-β-[3-(1'-fluoro-2'-bromo-ethyl)-n-propyl-phenyl]-propionyl chloride and 1,1-dimethyl-2-N-i-butyl-amino-ethanol;

(j) α-Chloro-β-(2-chloro-4-nitrophenyl)-propionyl chloride and 1-bromo-2-hydroxy butyn-(3)-yl-alcohol;

(k) α-Chloro-β-[3-(1'-fluoro-2'-bromo-ethyl)-n-propyl phenyl]-propionyl chloride and 1-fluoro-2-amino-butyn-(3)-yl alcohol;

(l) α-Chloro-β-[4-(1'-chloro-2'-bromo-ethyl-phenyl]-propionyl chloride and 3-chloro-5-hydroxy-8-N-methyl-amino-octanol;

(m) α-Chloro-β-(3-methyl-5-nitro-phenyl)-propionyl chloride and sec.-butyl amine;

(n) α-Chloro-β-[4-(3',3',3'-trichloro)-n-propyl phenyl]-propionic acid and N-iso-propyl-N-n-butyl amine; the particular propionic acid compounds, respectively, are formed;

(a') α-Chloro-β-(4-bromophenyl)-propionic acid potassium salt;

(b') Bis-[α-chloro-β-(3-nitro-phenyl)-propionic acid] calcium salt;

(c') Bis-[α-chloro-β-(4-[3',3',3'-trichloro]-n-propyl phenyl)-propionic acid] magnesium salt;

(d') α-Chloro-β-(2-chloro-4-nitro-phenyl)-propionic acid-3'-bromo-octyl ester;

(e') α-Chloro-β-(3-fluoro-phenyl)-propionic acid 1',1'-dimethyl-2'-fluoro-ethyl ester;

(f') α-Chloro-β-(2-isopropyl-phenyl)-propionic acid 2'-hydroxy-allyl ester;

(g') α-Chloro-β-(3-methyl-5-nitrophenyl)-propionic acid 2'-amino butyn-(3')-yl-1' ester;

(h') α-Chloro-β-[4-(1'-chloro-2'-bromo-ethyl)-phenyl]-propionic acid 4''-N-methyl-amino-octyl ester, (i') α-Chloro-β-[3-(1'-fluoro-2-ethyl)-n-propyl-phenyl]-propionic acid 1'',1''-dimethyl-2''-N-i-butyl amino-ethyl ester;

(j') α-Chloro-β-(2-chloro-4-nitrophenyl)-propionic acid 1'-bromo-2'-hydroxy butyn-(3')-yl-1' ester;

(k') α-Chloro-β-[3-(1'-fluoro-2'-bromo-ethyl)-n-propyl phenyl]-propionic acid 1''-fluoro-2''-amino-butyn-(3'')-yl-1'' ester;

(l') α-Chloro-β-[4-(1'-chloro-2'-bromo-ethyl)-phenyl]-propionic acid 3''-chloro-5''-hydroxy-8''-N-methyl-amino-octyl ester;

(m') α-Chloro-β-(3-methyl-5-nitro-phenyl)-propionic acid-N-sec.-butyl amide;

(n') α-Chloro-β-[4-(3',3',3'-chloro)-n-propyl-phenyl]-propionic acid N-i-propyl-N-n-butyl amide.

It will be appreciated, in accordance with the present invention, that in connection with the foregoing formulae: Z represents the radical —OR, or the radical

R represents hydrogen; a salt-forming anion, such as ammonium, methyl-, ethyl-, n-propyl-, isopropyl-, n-butyl-, isobutyl-, sec.-butyl-, tert.-butyl-, etc., -ammonium, especially lower alkyl ammonium and most especially $C_1$–$C_4$ alkyl ammonium, a metal ion, such as potassium, calcium, magnesium, and the like, especially alkali metal- and alkaline earth metal-ions, and the like; and aliphatic hydrocarbon radicals, such as methyl, ethyl, n-propyl, isopropyl, n-butyl, isobutyl, sec.-butyl, tert.-butyl, pentyl, hexyl, heptyl, octyl, nonyl, decyl, undecyl, dodecyl, etc., vinyl, γ-, β-, and γ- -allyl, butenyl, ethynyl, propynyl, butynyl, etc., especially $C_1$–$C_{12}$ aliphatic hydrocarbon radicals, including $C_1$–$C_{12}$ alkyl, and especially lower alkyl, such as $C_1$–$C_4$ lower alkyl, also including $C_2$–$C_4$ alkenyl, i.e., lower alkenyl, and also including $C_2$–$C_4$ alkynyl, i.e., lower alkynyl; as well as the aforementioned aliphatic hydrocarbon radicals which are mono-, di-, and poly-substituted with halogen, including chloro, bromo, fluoro, and iodo, as well as mixtures of such halo groups, hydroxy, amino, alkyl amino, including mono- and di-methyl-, ethyl-, n-propyl-, isopropyl-, n-butyl-, isobutyl-, sec.-butyl-, tert.-butyl-, etc., -amino, and mixed di-alkyl amino, most especially N-($C_1$–$C_4$) alkyl amino and N,N-di-($C_1$–$C_4$) alkyl amino as well as mixed halo, hydroxy, amino, and alkyl amino substituents for the aforesaid aliphatic hydrocarbon radicals;

R' and R'' each respectively represent the same or different radicals including hydrogen anl alkyl, such as methyl, ethyl, n-propyl, isopropyl, n-butyl, isobutyl, sec.-butyl, tert.-butyl, especially lower alkyl, and most especially $C_1$–$C_4$ alkyl;

X represents as substituents for the phenyl ring, mono-, di- and tri- -halo, -nitro, -alkyl, -halo alkyl, as well as mixed substituents of such types, including as halo substituents, chloro, bromo, fluoro, iodo and mixed halo substituents; methyl, ethyl, n-propyl, iso-propyl, etc., and especially $C_1$–$C_3$ alkyl; mono-, di-, tri- -chloro, -bromo, -fluoro and -iodo, as well as mixed di- and tri- -chloro, -bromo, -fluoro, and -iodo-substituted -methyl, -ethyl, -n-propyl, -isopropyl, and the like radicals, especially chloro and/or fluoro substituted, and most especially tri-halo, and specifically tri-fluoro, substituted methyl, i.e., halo-$C_1$–$C_3$ alkyl, and most especially such halo-($C_1$–$C_3$)-alkyl having 1–3 halo substituents; and n represents a whole number from 1–3, i.e., 1, 2 or 3, and especially 1 or 2, although where n is 2 or 3, X may be the same or different substituents.

In connection with the foregoing it will be appreciated that preferably n is 1 or 2, in which case X will be mono-chloro, preferably 4-chloro, or di-chloro, and also Z is lower alkoxy, and especially methoxy, whereby the compounds contemplated are the corresponding methyl esters. Also preferred in accordance with the invention are those compounds in which n is 1 or 2, in which case X will be mono-chloro, preferably 4-chloro or dichloro, and also A is halo lower alkoxy, and especially 2-chloroethyloxy.

All of the foregoing compounds contemplated by the present invention possess the desired selective herbicidal properties, and especially the capability of selectively destroying weeds, whereby selective combating of wild oats and other grass-like weeds in cereals, etc., is possible. It will be realized that the instant compounds possess total herbicidal action when used in large quantities, although selective herbicidal action is obtained when used in smaller quantities. As contemplated herein, the term "weeds" is meant to include not only weeds in the narrow sense, but also in the broad sense, whereby to cover all plants and vegetation considered undesirable for the particular purposes in question, especially cereal grains and most especially wild oats.

The present invention contemplates, in addition to the foregoing, the particular new compounds α-chloro-β-(4-chlorophenyl)-propionic acid methyl ester having the formula

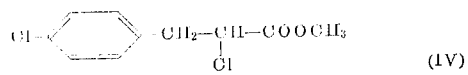

(IV)

and α-chloro-β-(3-chlorophenyl)-propionic acid methyl ester having the formula

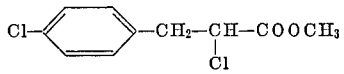 (III)

which are indeed effective in combating and controlling wild oats as selective herbicides in cereal grains.

It will be appreciated that the instant specification and examples are set forth by way of illustration and not limitation, and that various modifications and changes may be made without departing from the spirit and scope of the present invention which is to be limited only by the scope of the appended claims.

The following compounds are particularly useful:

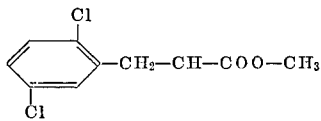

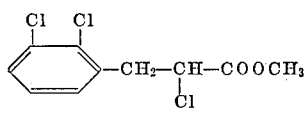

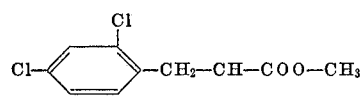

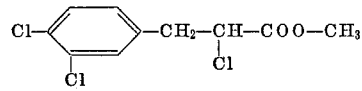

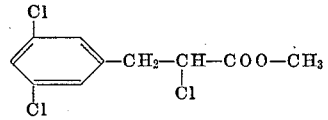

What is claimed is:
1. α-Chloro-β-(4-chlorophenyl)-propionic acid methyl ester having the formula

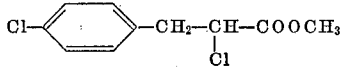

References Cited

Baker et al. Chemical Society Journal (London) 1950 pt. II p. 1547.

Nesmeyanov et al. Tetrahedron V. 17 p. 74 and p. 76 (1962).

LORRAINE A. WEINBERGER, Primary Examiner

E. J. GLEIMAN, Assistant Examiner

PO-1050
(5/69)

UNITED STATES PATENT OFFICE
CERTIFICATE OF CORRECTION

Patent No. 3,557,189  Dated January 19, 1971

Inventor(s) 1) Ludwig Eue  2) Helmuth Hack
            3) Kurt Westphal  4) Richard Wegler It is certified that error appears in the above-identified patent and that said Letters Patent are hereby corrected as shown below:

Column 8, Table II

1st column of figures, last item (XVI') "40"  should read --10--
       5                   5

Column 10, First Table

No. 8, last column "142/0.01" should read --142/0.08--

No. 9, last column "166/0.3"  should read --166/0.1--

No.20, last column "125/0.1" should read --125/10--

Column 12, line 24

"anl" should read --and--

Signed and sealed this 15th day of June 1971.

(SEAL)
Attest:

EDWARD M. FLETCHER, JR.  
Attesting Officer

WILLIAM E. SCHUYLER, JR.  
Commissioner of Patents